(12) United States Patent
Krone, Jr. et al.

(10) Patent No.: US 6,496,593 B1
(45) Date of Patent: Dec. 17, 2002

(54) OPTICAL MUZZLE BLAST DETECTION AND COUNTERFIRE TARGETING SYSTEM AND METHOD

(75) Inventors: Norris J. Krone, Jr., McLean, VA (US); Duane A. Burchick, Fort Washington, MD (US); Roger B. Pierson, Castleton, VA (US); Mehmet C. Ertem, McLean, VA (US); Thomas J. Ippolito, Potomac, MD (US)

(73) Assignee: University Research Foundation, Inc., Greenbelt, MD (US)

( * ) Notice: Subject to any disclaimer, the term of this patent is extended or adjusted under 35 U.S.C. 154(b) by 0 days.

(21) Appl. No.: 09/305,306

(22) Filed: May 5, 1999

Related U.S. Application Data

(60) Provisional application No. 60/084,544, filed on May 7, 1998.

(51) Int. Cl.[7] .................................................. G06K 9/00
(52) U.S. Cl. ........................................ 382/104; 340/540
(58) Field of Search .......................... 382/103; 340/540, 340/600; 250/330, 339.05, 334, 349, 332, 342; 348/155, 154

(56) References Cited

U.S. PATENT DOCUMENTS

| | | | |
|---|---|---|---|
| 3,723,960 A | 3/1973 | Harris | 340/6 R |
| 3,772,594 A | 11/1973 | Kuehnast | 324/72 |
| 3,936,822 A * | 2/1976 | Hirschberg | 340/420 |
| 4,118,733 A | 10/1978 | Sarson et al. | 358/109 |
| 4,138,660 A | 2/1979 | Hill | 340/16 R |
| 4,221,966 A | 9/1980 | Kerr et al. | 250/338 |
| 4,246,480 A | 1/1981 | Clark | 250/349 |
| 4,977,323 A | 12/1990 | Jehle | 250/332 |
| 5,149,969 A | 9/1992 | Fouilloy et al. | 250/334 |
| 5,299,971 A | 4/1994 | Hart | 446/484 |
| 5,349,853 A * | 9/1994 | Oehler | 73/167 |
| 5,398,057 A | 3/1995 | Tapp | 348/154 |
| 5,449,307 A | 9/1995 | Fuereder | 441/2 |
| 5,454,048 A | 9/1995 | Davis | 382/281 |
| 5,463,566 A | 10/1995 | Marrucci et al. | 364/516 |
| 5,473,368 A | 12/1995 | Hart | 348/155 |
| 5,686,889 A * | 11/1997 | Hillis | 340/540 |
| 5,703,321 A * | 12/1997 | Feierlein et al. | 102/427 |
| 5,970,024 A | 10/1999 | Smith | 367/128 |
| 6,178,141 B1 | 1/2001 | Duckworth et al. | 367/127 |
| 6,198,404 B1 | 3/2001 | Campagnuolo et al. | 340/691.2 |
| 6,215,731 B1 | 4/2001 | Smith | 367/128 |

FOREIGN PATENT DOCUMENTS

| | | |
|---|---|---|
| DE | 29 00 444 | 7/1980 |
| DE | 3504522 | 8/1986 |
| DE | 42 28 539 | 3/1994 |

OTHER PUBLICATIONS

Stix, "Sounding Out Snipers", Scientific American, p. 33.
(Author not mentioned in article) National Physical Laboratory Accoustics: "Sound Measurements—Introduction", Jun. 25, 2001, internet site www.npl.co.uk/npl/acoustics/publications/soundmeasurements/introduction.html, Teddington, Middlesex, UK.

* cited by examiner

Primary Examiner—Andrew W. Johns
Assistant Examiner—Seyed Azarian

(57) ABSTRACT

A system for remote detection of muzzle blasts produced by rifles, artillery and other weapons, and similar explosive events. The system includes an infrared camera, image processing circuits, targeting computation circuits, displays, user interface devices, weapon aim point measurement devices, confirmation sensors, target designation devices and counterfire weapons. The camera is coupled to the image processing circuits. The image processing circuits are coupled to the targeting location computation circuits. The aim point measurement devices are coupled to the target computation processor. The system includes visual target confirmation sensors which are coupled to the targeting computation circuits.

11 Claims, 6 Drawing Sheets

OPTICAL MUZZLE BLAST DETECTION AND COUNTERFIRE TARGETING SYSTEM AND METHOD

REFERENCE TO RELATED APPLICATION

This invention is the subject of provisional application Ser. No. 60/084,544 entitled THE VECTORED INFRARED PERSONNEL ENGAGEMENT AND RETURNFIRE (VIPER) SYSTEM AND ITS COUNTER SNIPER APPLICATION (U) filed May 7, 1998.

FIELD OF THE INVENTION

The present invention relates to (1) an optical muzzle blast detection and counterfire targeting system for remotely detecting the location of muzzle blasts produced by rifles, artillery and other weapons and similar explosive events, especially sniper fire; and (2) a system for directing counterfire weapons on to this location.

PRIOR ART

Hillis U.S. Pat. No. 5,686,889 relates to an infrared sniper detection enhancement system. According to this Hillis patent, firing of small arms results in a muzzle flash that produces a distinctive signature which is used in automated or machine-aided detection with an IR (infrared) imager. The muzzle flash is intense and abrupt in the 3 to 5 mum band. A sniper detection system operating in the 3 to 5 mum region must deal with the potential problem of false alarms from solar clutter. Hillis reduces the false alarm rate of an IR based muzzle flash or bullet tracking system (during day time) by adding a visible light (standard video) camera. The IR and visible light video are processed using temporal and/or spatial filtering to detect intense, brief signals like those from a muzzle flash. The standard video camera helps detect (and then discount) potential sources of false alarm caused by solar clutter. If a flash is detected in both the IR and the visible spectrum at the same time, then the flash is mostly probably the result of solar clutter from a moving object. According to Hillis, if a flash is detected only in the IR, then it is most probably a true weapon firing event.

In Hirshberg U.S. Pat. No. 3,936,822 a round detecting method and apparatus are disclosed for automatically detecting the firing of weapons, such as small arms, or the like. According to this Hirshberg patent, radiant and acoustic energy produced upon occurrence of the firing of a weapon and emanating from the muzzle thereof are detected at known, substantially fixed, distances therefrom. Directionally sensitive radiant and acoustic energy transducer means directed toward the muzzle to receive the radiation and acoustic pressure waves therefrom may be located adjacent each other for convenience. In any case, the distances from the transducers to the muzzle, and the different propagation velocities of the radiant and acoustic waves are known. The detected radiant (e.g. infrared) and acoustic signals are used to generate pulses, with the infrared initiated pulse being delayed and/or extended so as to at least partially coincide with the acoustic initiated pulse; the extension or delay time being made substantially equal to the difference in transit times of the radiant and acoustic signals in traveling between the weapon muzzle and the transducers. The simultaneous occurrence of the generated pulses is detected to provide an indication of the firing of the weapon. With this arrangement extraneously occurring radiant and acoustic signals detected by the transducers will not function to produce an output from the apparatus unless the sequence is corrected and the timing thereof fortuitously matches the above-mentioned differences in signal transit times. If desired, the round detection information may be combined with target miss-distance information for further processing and/or recording.

SUMMARY OF THE INVENTION

According to the present invention, an infrared camera stares at its field of view and generates a video signal proportional to the intensity of light. The camera is sensitive in the infrared spectral band where the intensity signature of the flash to be detected minus atmospheric attenuation is maximized. The video signal is transmitted to an image processor where temporal and spatial filtering via digital signal processing to detect the signature of a flash and determine the flash location within the camera's field of view. The image processing circuits are analog and digital electronic elements. In another aspect and feature of the invention, the image processing circuits are coupled to target location computation circuits and flash location information is transmitted to the targeting location computation circuits. The targeting computation circuit is digital electronic circuitry with connections to the other devices in the system. The field of view of the camera is correlated to the line of sight of the confirmation sensor by using aim point measurement devices which are coupled to the target computation processor. The displays are video displays and show camera derived imagery superimposed with detection and aiming symbology and system status reports. The user interface devices are keypads and audible or vibrational alarms which control the operation of the system and alert the user to flash detections which are equated to sniper firing, for example. In still another aspect of the invention, the weapon aim point measurement devices include inertial measurement units, gyroscopes, angular rate sensors, magnetometer-inclinometers, or gimbaled shaft encoders. Visual target confirmation sensors are binoculars or rifle scopes with associated aim point measurement devices. Counterfire weapons contemplate rifles, machine guns, mortars, artillery, missiles, bombs, and rockets.

OBJECTS OF THE INVENTION

The basic objective of the present invention is to provide an improved muzzle blast detector system and method which uses multi-mode filtering to eliminate and/or minimize false alarms.

Another object of the invention is to provide a muzzle blast detector which accurately locates direction and range to muzzle blast source.

Another object of the invention is to provide a sniper detection method and apparatus which uses temporal, spectral and spectral filtering to discriminate between actual muzzle blasts and non-muzzle blast infrared generating events.

DESCRIPTION OF THE DRAWINGS

The above and other objects, advantages and features of the invention will become clear from the following description and accompanying drawings, wherein.

DETAILED DESCRIPTION OF THE INVENTION

Figure 1:
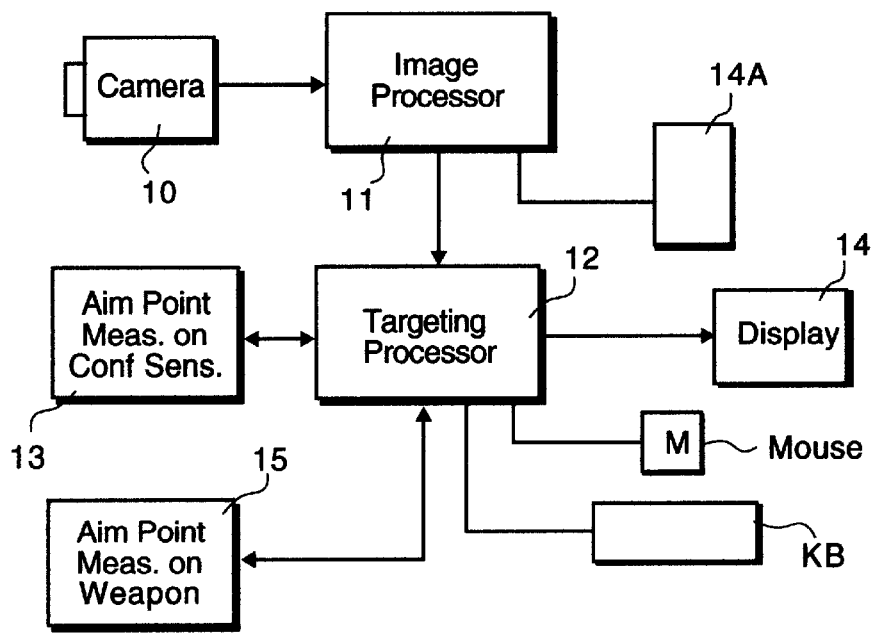
FIG. 1 is a general block diagram of a muzzle blast detection system incorporating the invention.

The aspect of the invention comprises an infrared camera 10 connected to image processing circuits 11 and a video display 14 which may include an annunciator 14A to provide an immediate audible or tactile indication of the muzzle blast event. The camera 10 stares at a field of view, and the video signal is fed to the image processor 11. The pedestal and gain controls of the camera are controlled by the image processor.

Detection

The image processor outputs the live infrared video to the display. Concurrently algorithms to detect the presence of a muzzle flash in the image are executed on the image processor. When a muzzle flash is detected the image processor 11 overlays a symbol on the display around the pixel location where the flash was detected. The algorithms that detect the muzzle flash operate by processing several frames of video data through a temporal and spatial digital filter. The activity level at each pixel location is adaptively tracked and the effect of background clutter is reduced by varying the detection threshold at each pixel according to the past activity around that pixel location. The detection algorithms are described in more detail in the section entitled Detection of Short Duration Transient Events Against a Cluttered Background.

Automatic Pedestal and Gain

An algorithm is used for automatic adjustment of the pedestal and gain values of the imaging system to achieve high dynamic range. Additional user control over these settings allows certain regions of the image to be dark or saturated. This algorithm is described in the section entitled Automatic Pedestal and Gain Adjustment Algorithm.

Targeting

The coordinates of the detected muzzle flash are fed to targeting circuitry 12 to guide a visual target confirmation sensor 13, such as binoculars or a telescope, and a counter-fire weapon, such as a rifle, onto the target.

Weapon Aim Point to Camera Coordinate Calibration

Given weapon aim point measurement readings 15, the corresponding image coordinates in the camera field of view are derived. The aim point measurement devices generate an azimuth and elevation reading. The calibration procedure includes aiming the weapon at three known calibration points. These points are marked by the user on the display 14 using a cursor. The image coordinates and the aim point measurements for these points are used to generate a mathematical transformation so that, given any aim point measurement, it's corresponding image location can be calculated. Symbology denoting the current weapon aim point is displayed on screen 14, and the difference in target screen locations is used to guide the return fire shooter onto the target.

Visual Confirmation

An aim point measuring device 15 is aligned with the confirmation sensor. This device provides the azimuth and elevation (line of sight) of the sensor. The aim point measurement device 15 is correlated to the camera optical axis and orientation using a multipoint calibration procedure, thereby relating azimuth and elevation readings to camera pixel locations. The targeting processor calculates the difference between muzzle flash detection location and the instantaneous pointing location and displays guidance symbology to direct the confirmation sensor to the target.

Confirmation Sensor Aim Point to Camera Coordinate Calibration

The line of sight of the confirmation sensor is calibrated to camera coordinates using the three-point calibration algorithm used for calibrating the weapon aim points to camera coordinates. Either the same or different calibration points can be used for weapon to camera and confirmation sensor to camera calibration. Symbology denoting the current confirmation sensor line of sight is displayed on screen, and the difference in target screen locations is used to guide the observer onto the target.

Calibration Using Gimbaled Telescope with Encoders

A telescope, on a gimbal with shaft encoders, mounted on the camera is used to determine the location of the calibration points. The user points the telescope at a calibration point. The telescope gimbal is aligned with the camera, and the image coordinates of the telescope line of sight are known. By selecting three calibration points and aiming the weapon or confirmation sensor at these points the transformation between the aim point measurement devices and camera coordinates can be calculated.

User Interface

The user interface includes a keyboard KB and cursor controlled mechanism M to control the operation of the system, a video display screen 14, and a detection alarm 14A. The user is alerted to a detection through an audible alarm of a silent tactical vibration, or other type of silent alarm device which is triggered by the targeting processor. The user is then guided through symbology overlaid on the display to move the confirmation, sensor weapon until the line of sight is aligned with the detected flash.

Ring Display

A peripheral vision aiming device is also used to guide a confirmation sensor or weapon to the target. The aiming device consists of a ring of individual lights controlled by the targeting processor. The ring may be placed on the front of a rifle scope, in line with the rifle's hard sites or other locations in the peripheral view of the operator. When a detection is made, the targeting processor activates one or more lights to indicate the direction and distance the confirmation sensor/weapon must be moved to achieve alignment with the flash. The number of activated lights increases as the degree of alignment increases. All lights are activated when alignment is achieved.

The following section describes the adaptive algorithm for detection of rapid transient events where a noisy background is present. The theoretical background and a sample implementation are given.

Introduction

It is desired to detect and locate transient events against a noisy background in real time. The detection and location of such an event requires a prior knowledge about the spectral, spatial and temporal signatures of typical events. It is also desirable to have information about the background conditions in which the detection system is expected to operate. This information consists of the spectral, spatial and temporal characteristics of the background.

If the statistics of the four-dimensional signal which is specified as the signature of a typical event (spectral, spatial and temporal axes) are known, and if the same statistics for various backgrounds are measured, it becomes a simple matter of applying standard stochastic analysis methods (matched filtering) in order to solve the problem. However, this information is not readily available and there are several other problems which make this approach unfeasible.

The first difficulty is that the instrumentation to simultaneously extract all components of signals that have spectral, spatial and temporal components is not readily available. Equipment is available to acquire simultaneously either the spectral and temporal (spectrometry), or the spatial and temporal (video) components from a scene. It is also possible, through the use of several imagers to acquire multispectral image sets, essentially sampling the scene at several spectral bands.

Operating at a suitably chosen fixed spectral band, the intensity variation as a function of time was the easiest component of the event signature to detect.

Detection Methods Which Deal Only with Spatially and Temporally Varying Signal Components at a Fixed Spectral Band The concept of matched filtering can be used if the statistics of the events to be detected and backgrounds are available. However, many factors, such as humidity, ambient temperature, range, sun angle, etc. influence these statistics. It is not practicable to gather data for all combinations of rapid transient events and background scenes. Thus, for the detection algorithm to reliably work against different background environments, it has to adapt to these environments.

The Detection System

Figure 2:
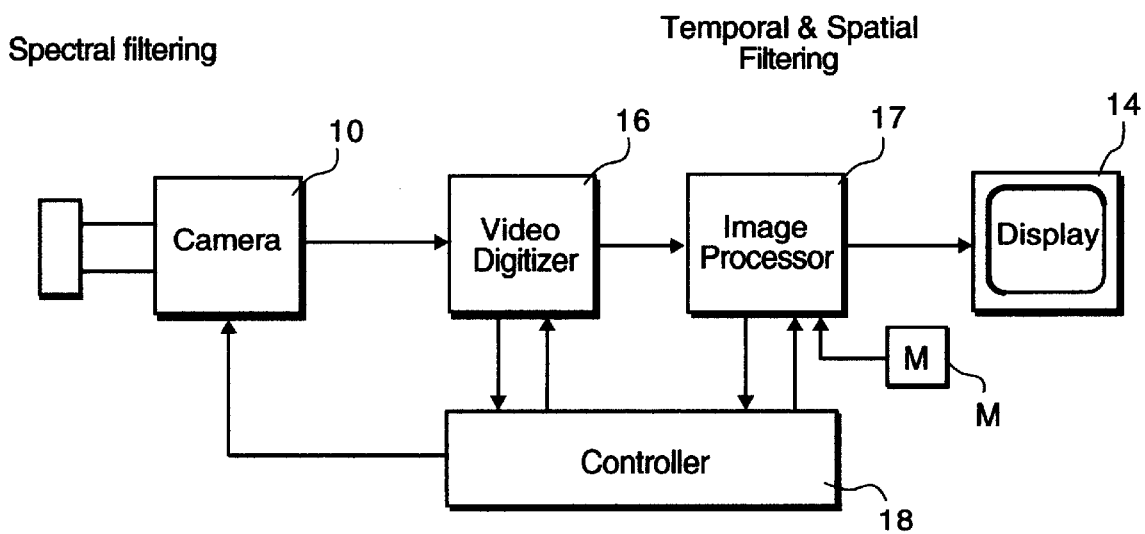
FIG. 2 is a further block diagram of the detection system of the invention.

The video signal from the camera 10, under control of controller 18, is digitized 16 and supplied to an image processing system 17 and continuously stored in memory M at frame rates (FIG. 2). In this invention, the image processor 17 is adapted to operate on the latest and several of the most recent frames captured. Although in this case the processor operates on progressively scanned 256×256 pixel frames at a rate of 60 frames per second, the algorithm can be used at other resolutions and frame rates.

The camera 10 being used is a CCD imager, which integrates the light falling on each pixel until that pixel's charge is read out. The read out time is typically much less than the typical transient event duration. This means that the imager effectively has a 100% duty cycle, with no dead times between frames for each pixel. The camera pedestal and gain settings are set to fully utilize the dynamic range of the image processing system. The algorithms for this are described later herein.

The first stage of the detection algorithm includes a temporal Event Filter 20 which is tuned to detect rapid transient signatures, followed by a spatio-temporal Detection Filter designed to reject background clutter. The output of this first stage is a list of candidate event times and locations. These coordinates form the input to a logical processing stage which then estimates the probability of the candidate event actually being due to a single uncorrelated rapid transient.

The Event Filter 20

The event filter 20 is a finite impulse response matched filter which operates on each pixel in the sequence. The impulse response of the filter is derived by estimating the signature of the typical transition event.

The events to be detected typically have much shorter duration than the frame repetition rate. Therefore, most of the time the rapid transients occur wholly inside one frame. However, it is possible to have a single event overlapping two adjacent frames. The time of occurrence of a transient event and the frame times are uncorrelated processes, and the overlap can be modeled by considering the event time to be uniformly distributed over the frame interval.

Figure 3A:
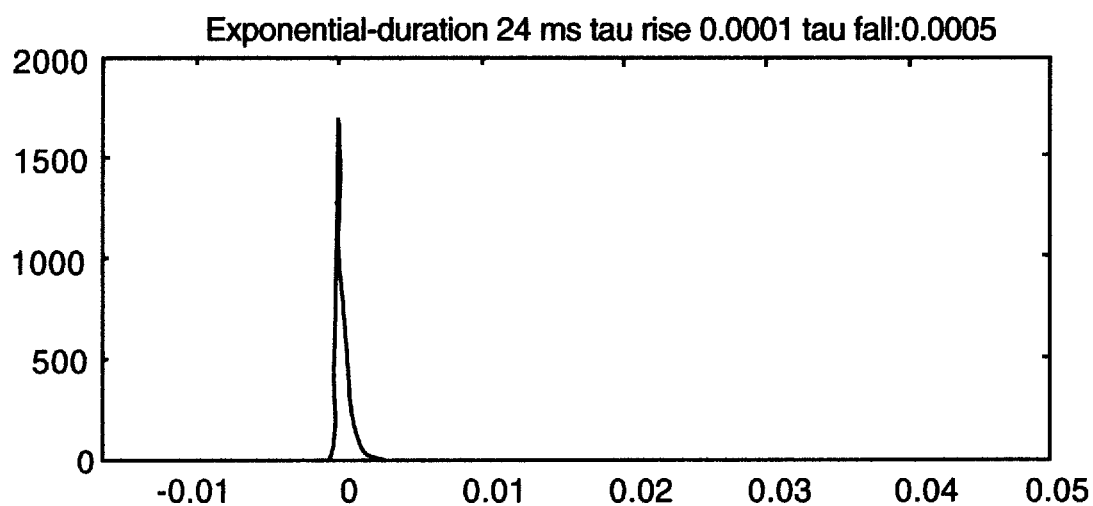
FIGS. 3A and 3B are graphs of simulated event signatures and corresponding matched filter for 60 FPS video.
Figure 3B:
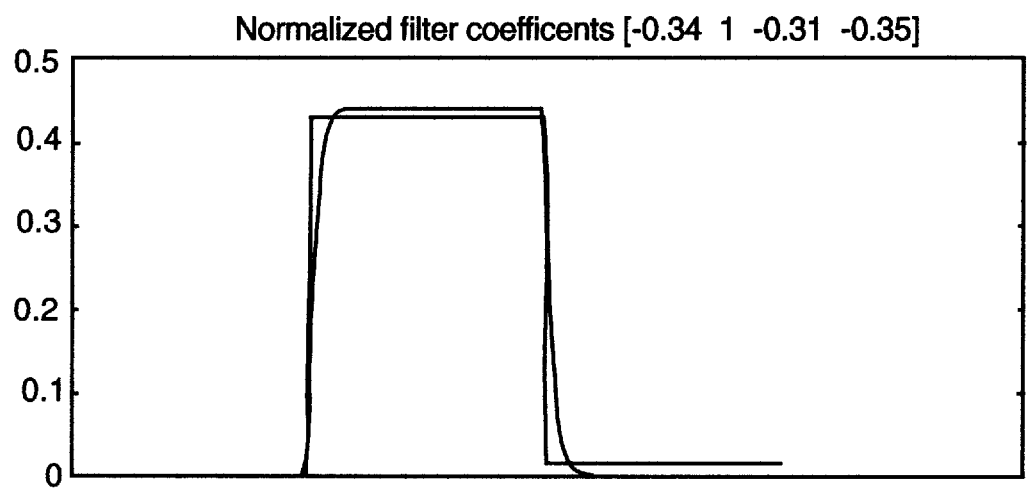
Figure 4:
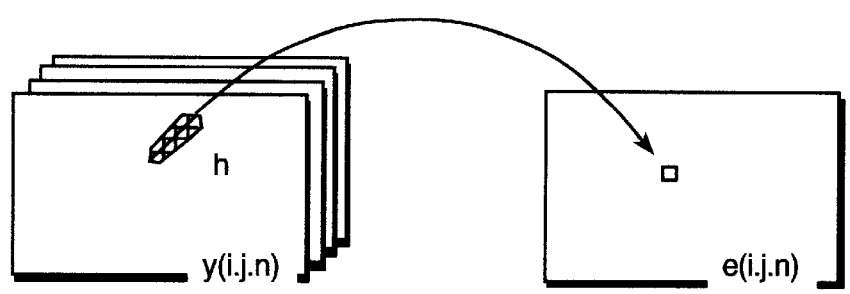
FIG. 4 is a diagrammatic representation of the event filter.

A simple model of a rapid transient signature consists of a pair of exponentials, one on the rising edge and another on the falling edge of the event. FIG. 3 shows the case where a rising time constant $\tau_r$ of 0.125 mS and a falling time constant $\tau_f$ of 0.5 mS are chosen. This waveform is convolved with the rectangular window of the frame and the result integrated over successive frame periods reveals the optimal matched filter coefficients.

The event filter then is a tapped delay line finite impulse response filter and its output, the error signal, can be written as the simple convolution:

$$e(i, j, n) = \sum_k h(k) y(i, j, n-k) \qquad (1)$$

Since h(k), the impulse response of the Event Filter is indexed only to the frame number, this filter is purely temporal and has no spatial effects.

The Detection Filter

Figure 5:
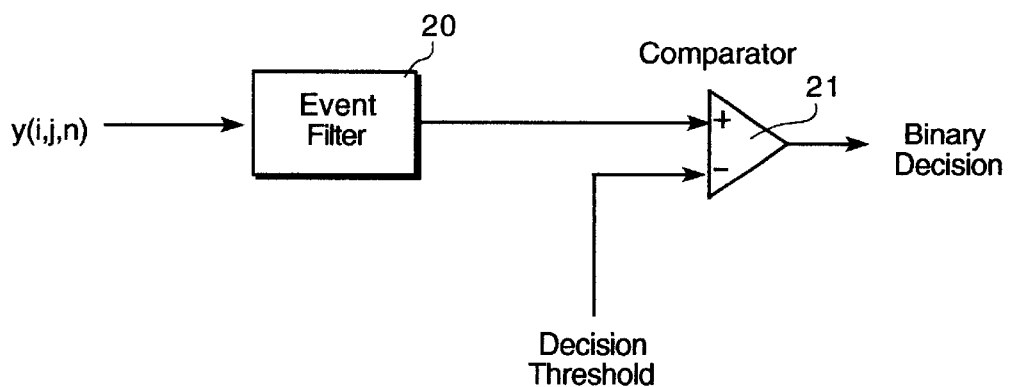
FIG. 5 illustrates a sample detection filter.
Figure 6:
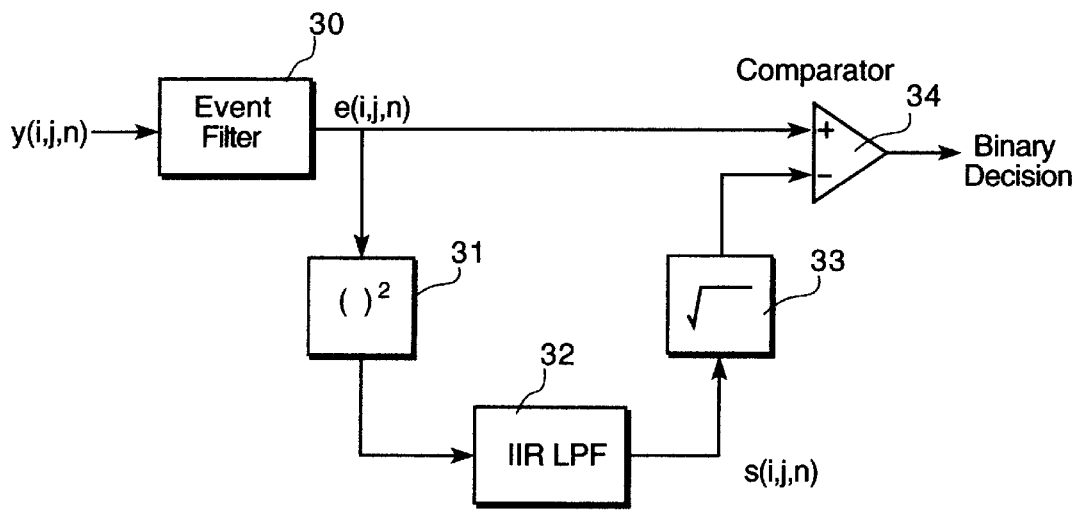
FIG. 6 is a circuit diagram of a detector with an adaptive threshold level.

The simplest detection scheme for a transient event consists of an event filter 20 followed by a threshold device (comparator 21, FIG. 5). This system works reasonably well in cases where the background scenery is not noisy and where false alarm rejection requirements are not demanding.

The simple detector approach is also useful in serving as a baseline to compare the performance of more complicated algorithms. A figure of merit can be devised for other algorithms by comparing their detection performance to the simple detector.

In order to reduce the false alarm rate additional processing is performed. The approach taken here is to use adaptive filtering methods to vary the decision threshold spatially, so that image areas of high activity have higher and areas of less activity have lower threshold levels. Thus, the threshold level becomes a varying surface across the image.

A good estimate of the activity level for each pixel in the image is the mean square of the signal e(i,j,n), the event filter output. Since this signal is already generated, its calculation imposes no additional computational burden. The calculation of the mean square however still needs to be performed.

Instead of the actual mean square computation to estimate the energy of the intensity signal at each pixel, a recursive estimate is used. Thus we define:

$$\sigma(i,j,n) = \mu \sigma(i,j,n-1) + (1-\mu) e(i,j,n) \qquad (2)$$

where $\mu$ the learning rate is a constant between 0 and 1. A typical value for $\mu$ is 0.95. The best choice for the learning rate will be determined depending on the stationarity of the background scene (in both the statistical and the physical senses).

The recursive formulation for $\sigma(i,j,n)$ makes it easy to implement. The infinite impulse response filter 32 that implements this has a low pass transfer function, and thus tends to "average out" the activity at each pixel location over its recent past.

To simplify implementation, it is possible to remove the square-root operation 33 on the threshold surface, and compare the estimated variance of the signal e to the square of its instantaneous value. Thus, the output of the comparator essentially becomes a measure of the difference of the instantaneous energy in the signal to the estimated average energy at that pixel.

Some of the physical phenomena that cause false alarms are edge effects, thermal effects such as convection, camera vibration, and moving objects. A significant portion of these can be eliminated by performing a spatial low pass operation on the variance estimate signal a. This is to spread the threshold raising effect of high energy pixels to their neighbors. However, a pure low pass operation would also lower the a values at the peaks of the curves. To offset this a "rubber-sheeting" low pass filter is used. This is mathematically analogous to laying a sheet of elastic material over the threshold surface. The threshold surface thus generated is calculated by:

$$\theta(i,j,n) = \max\{\sigma(i,j,n), \sigma_{LP}(i,j,n)\} \quad (3)$$

where $\sigma_{LP}$ is the low pass filtered estimated variance, calculated by the convolution:

$$\sigma_{LP}(i, j, n) = \sum_k \sum_l h(k, l)\sigma(i-k, j-l, n) \quad (4)$$

Figure 7:
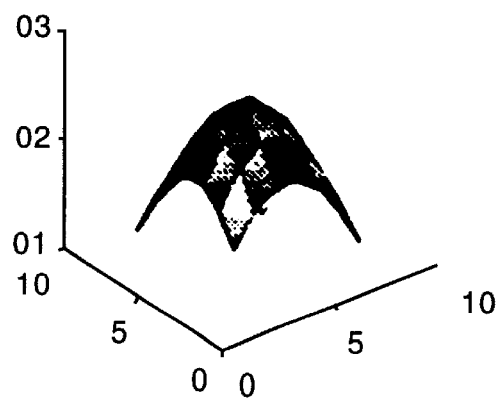
FIG. 7 is a depiction of a low pass spatial filter response h (K,l)

The low pass spatial filter 45 coefficients h(k,l) are chosen depending on the sharpness desired. A set of values which gives good results is generated using a normalized sinc function is plotted in FIG. 7.

Figure 8:
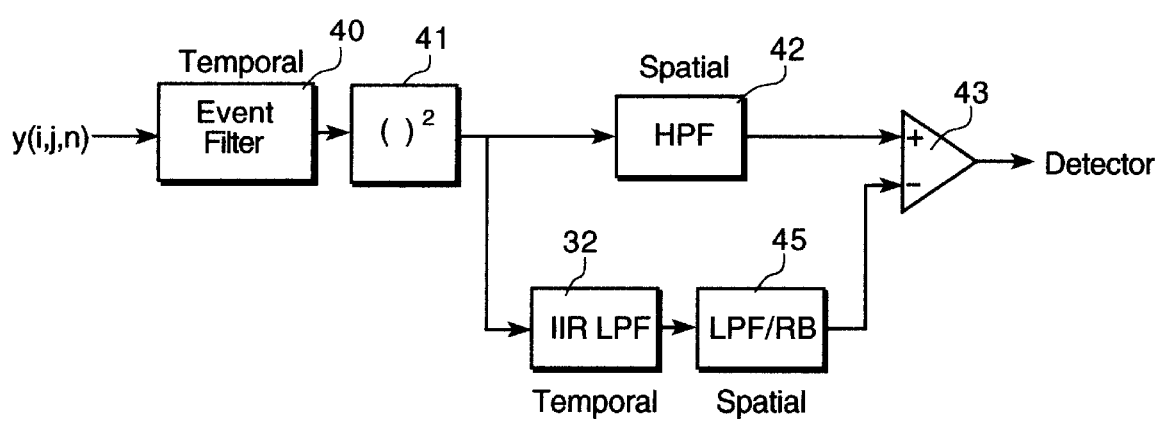
FIG. 8 is a circuit diagram showing adaptive detection system with low pass filtered "σ" and high pass filter $e^2$.

A possible enhancement to the detection algorithm is the inclusion of a spatial high pass filter 42 to reject image events which occupy large areas. Depending on the application (i.e. whether rapid transient events which occupy relatively large areas are desired to be detected or not), such a filter may reduce the system's susceptibility to false alarms due to events which are not of interest. The block diagram of the detector incorporating these modifications is shown in FIG. 8.

It should also be noted that in the system shown the comparator 43 output is no longer a binary decision but a difference signal. While it is possible to use the compactors' binary output as a final decision stage, it is convenient to further process the output of the detection filter.

Figure 9:
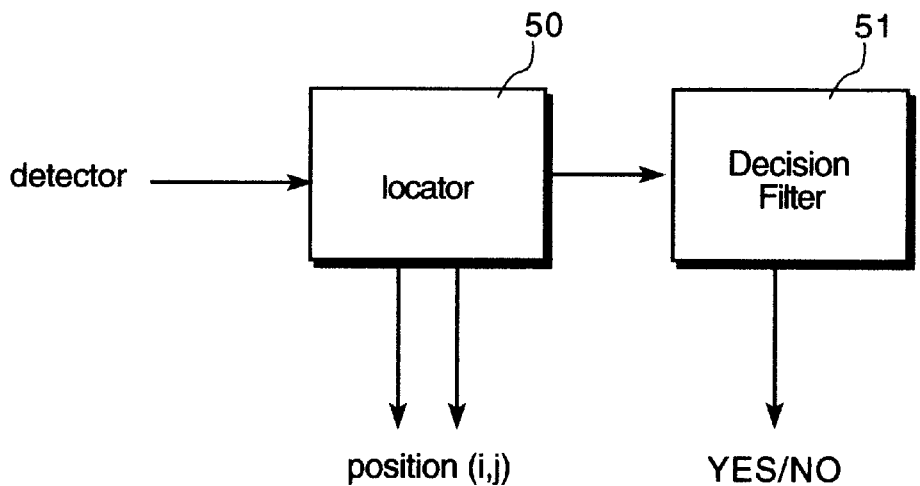
FIG. 9 illustrates the decision filter.

The Decision Filter (FIG. 9)

For each pixel, a value for the detector signal det(i,j,n) is generated at the frame rate. Thus, the data rate of the detector output is comparable to the raw image data rate. The detector signal is a measure of the likelihood that an event has occurred at the corresponding pixel. This information has to be reduced to a simple indication of the presence and location of the event. The decision filter performs the required operation.

The detector output can be filtered in several ways. The obvious and simple method is to compare it with a set threshold value. Another way is to first localize the possible location of the one most likely event in each frame, and then to decide whether it actually is present or not. This approach is simple to implement and results in significant reduction in the amount of data to be processed. Its limitation is that it does not allow the detection of multiple transient events occurring within a single frame.

The location of a single candidate transient event per frame is done in locator 50 by finding the pixel location with the maximum detector output. If this signal exceeds a detector threshold T, then a "Transient Detected In Frame" indication is output, otherwise the output indicates "No Transient Detected In Frame".

The decision filter 51 operations are as follows:

$$d(n) = \max_{i,j} \{det(i, j, n)\} \quad (5)$$

$$T(n) = \alpha T(n-1) + (1-\alpha)d(n) \quad (6)$$

$$T(n) = \alpha T(n-1) + (1-\alpha)d(n) \quad (6)$$

This operation, similar to the calculation of σ, is a recursive implementation of an adaptive threshold. The learning rate α (again chosen between 0 and 1 and typically about 0.9) determines the speed with which the system adapts to changes in the background levels.

The decision filter block diagram is shown in FIG. 9.

Figure 10:
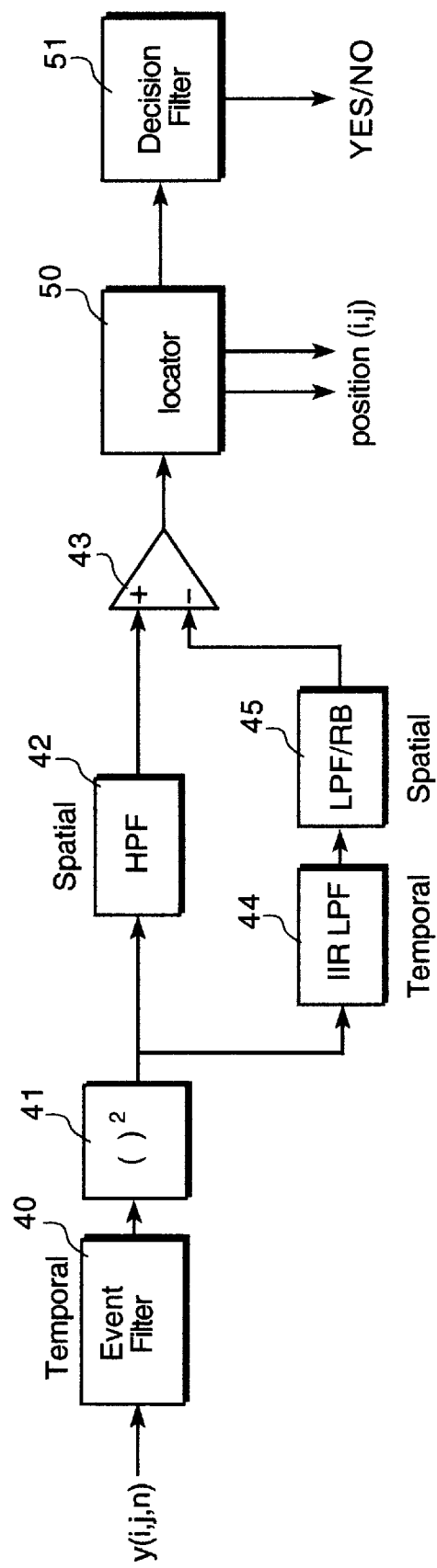
FIG. 10 illustrates the overall detection and location algorithm.

The overall block diagram of the adaptive detection algorithm is shown in FIG. 10.

Using the approach presented here, it is possible to determine the presence or absence of short duration transient events. The invention is especially useful when the background scene is cluttered and contains elements which have statistical properties similar to those of the events being searched for. This is done by utilizing as much of the available knowledge about the spectral, spatial, and temporal characteristics of the events to be detected.

Automatic Pedestal and Gain Adjustment Algorithm

The detection of a rapid transient event in a noisy background is significantly degraded if the full dynamic range of the imaging system is not used. This presents a simple algorithm for automatic adjustment of the pedestal and gain values of the imaging system to achieve high dynamic range. In some situations it is desired to have additional control over exposure to allow certain regions of the image to be dark or saturated. A version of the algorithm with exposure control is given below.

Automatic Pedestal and Gain Adjustment Algorithms

Figure 11:
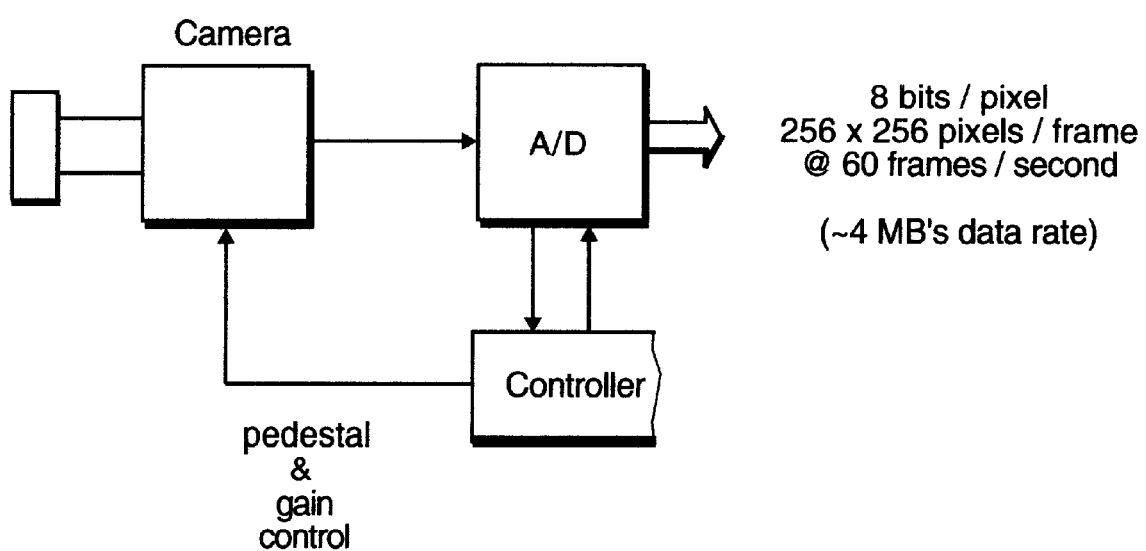
FIG. 11 illustrates the video acquisition subscription.

The pedestal and gain adjustment algorithm presented here assumes an 8 bit imaging system is being used. The response is assumed to be roughly linear. However, the algorithm will work well with nonlinear imagers as well. The image acquisition subsystem block diagram is shown in FIG. 11.

Two versions of the algorithm are presented here. The simpler first version automatically sets the pedestal and gain values to equalize the image so that all pixels lie throughout the full range of the imaging system. The coefficients of the system have to be adjusted so that the response is not oscillatory (i.e. their values have to be chosen so that the closed loop transfer function has magnitude less than unity). In the slightly more complex second version, the user is given an additional control to allow under- or over-exposure as desired.

The following procedure summarizes the detection system algorithm without exposure control:

Grab one frame of data. Within a region of interest (typically the whole picture minus a frame around the edges) count the number of saturated pixels ($n_{sat}$) and the number at full darkness ($n_{zer}$). Measure the value of the darkest pixel (botgap) and the distance between the brightest pixel and 255 (topgap). Change the pedestal and gain settings to spread the histogram of the image. Repeat for next frame.

The dynamic pedestal and gain equations are:

$$\Delta p = p_1 n - p botgap$$

$$\Delta g = -g_1 n + g_2 topgap - k p$$

pedestal=pedestal+$\Delta p$ gain=gain+$\Delta g$

Optimal values for the tracking parameters $p_1, p_2, g_1, G_2$ and k depend on the camera response. However, since feedback is used, this effectively "linearizes" the control loop, and depending on the temporal response desired, suitable values can be derived empirically.

The following describes the detection algorithm with exposure control.

This version is slightly more complex in that it adds an exposure control input to the original algorithm. The variable exposure determines the amount of under- or overexposure desired. This operates in a manner analogous to the exposure control found in automatic cameras. When exposure is set at a positive value, the pedestal and gain dynamics are set to allow a number of pixels to stay saturated (overexposure). Similarly, a negative exposure control allows a number of pixels to stay at zero (underexposure). The dynamic equations are:

$n_{up}=n_{zer}+\min(\text{exposure},0)$ $n_{down}=n\text{sac}-\max(\text{exposure},0)$ $\Delta p=p_1 n_{up}-p_2 \text{botgap}$ $\Delta g=-g_1 n_{down}+g_2 \text{topgap}-k\Delta p$ pedestal=pedestal+$\Delta p$ gain=gain+$\Delta g$ Thus, with a positive exposure setting, the only effect is at the top end of the digitization range, so that $n_{up}$ is not altered (it stays equal to $n_{zer}$) but $n_{down}$ is less than $n_{sat}$. This means that a number of pixels (equal to the magnitude of exposure) are allowed to stay saturated. Conversely, with a negative exposure ndow is unaltered but $n_{up}$ is allowed to go to a negative number, signifying that a number of pixels are allowed to stay dark.

While the invention has been described and illustrated in relation to preferred embodiments of the invention, it will be appreciated that other embodiments, adaptations and modifications of the invention will be readily apparent to those skilled in the art.

What is claimed is:

1. In a method of detecting muzzle blasts at a distance comprising the steps of generating an infrared image signal of a selected field of view and outputting said infrared image signal in frames as a live infrared video signal, spectrally filtering each frame of said live infrared video signal to pass only frequencies within a predetermined infrared frequency range, temporally filtering each frame of said live infrared video signal to only include events within a predetermined time period, spatially filtering each frame of said live video signal to pass only said video signals having a predetermined shape, and combining the results of the spectral, temporal and spatial filtering to determine the presence or absence of a muzzle blast within said field of view, determining the coordinates of position of any detected muzzle blast within said field of view.

2. The method defined in claim 1 including the step of detecting any muzzle blast sound burst in said field of view, measuring the time interval between detection of said muzzle blast within said field of view and the time of detection of said muzzle blast sound burst, and calculating the distance to said muzzle blast.

3. The method defined in claim 1 including actuating a warning device upon detection of a muzzle blast within said field of view.

4. The method defined in claim 1 including the step of coupling said coordinates of position to a return fire aiming device and controlling the direction of fire of said return fire device in accordance with said detection of a muzzle blast.

5. The method defined in claim 1 including determining the range to said muzzle blast from said observation point by comparing the time of occurrence of the radiant energy by the muzzle blast with the detection of a sound burst from said muzzle blast and calculating the range from said observation point to said muzzle blast.

6. The method defined in claim 1 wherein said infrared image signal is defined by an array of pixels and each pixel location is adaptively tracked and the effect of background clutter is reduced by varying the detection threshold at each pixel according to the past activity around the pixel location.

7. The method defined in claim 1 wherein said spatially filtering each frame of said live video signal to pass only video signals having predetermined shape comprises adaptively filtering said infrared image signal so that image areas of high activity have higher threshold levels and areas of less activity have lower threshold levels whereby the threshold level becomes a varying surface across the image.

8. The method defined in claim 1 wherein false alarms caused by edge effects, thermal effects such as convection, camera vibration and moving objects are eliminated or minimized by performing a spatial low pass filter operation on a variance estimate signal.

9. The method defined in claim 1 wherein detection is provided in the exposure material in the following manner:

select one frame of data, within a region of interest in the selected frame, count the number of saturated pixels and the number of full-darkness pixels, measure the value of the darkest pixel and the distance between the brightest pixel and change the pedestal and gain setting for the image, and repeat for the next frame.

10. The method defined in claim 9 wherein the variable exposure determines the amount of under- or over-exposure desired such that when the exposure is set at a positive value, the pedestal and gain dynamics are set to allow a number of pixels to stay saturated and, similarly, when a negative exposure control zone is selected it allows the number of pixels to stay at zero or under.

11. In a system for detecting a muzzle blast wherein an infrared camera adapted to be trained on a selected field of view outputting frames of real time infrared video signals, spectral filter (SF) for detecting predetermined intensity variations in each frame of infrared video signals to provide a first signal component indication of an event signature, a temporal event filter (TEF) connected to said SF for detecting rapid transient signatures and outputting signals representative of candidate-event times and location in said selected field of view, a spatial filter (SF) connected to said TEF for passing video signals having selected shapes, a computer connected to said SF for comparing the output of said SF with a selected threshold and outputting a binary decision indicating the presence or absence of a muzzle blast in a sequence of frames of said real time infrared video signals, a locator for determining the X and Y coordinates of the position of said muzzle blast in said selected field of view, and a display for displaying said X and Y coordinates and said range signal to a return fire shooter.

* * * * *

UNITED STATES PATENT AND TRADEMARK OFFICE
Certificate

Patent No. 6,496,593 B1                                              Patented: December 17, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Norris J. Krone, Jr., McLean, VA (US); Duane A. Burchick, Fort Washington, MD (US); Roger B. Pierson, Castleton, VA (US); Mehmet C. Ertem, McLean, VA (US); Thomas J. Ippolito, Potomac, MD (US); Stanley Moroz, Waldorf, MD (US); John T. Caufield, Santa Barbara, CA (US); Patrick Gower, Rockville, MD (US); and James McDonald, Raleigh, NC (US)

Signed and Sealed this Third Day of August 2010.

<div style="text-align:right">

Matthew C. Bella
*Supervisory Patent Examiner*
Art Unit 2624
Technology Center 2600

</div>